United States Patent [19]

Scoggins

[11] 3,867,357

[45] Feb. 18, 1975

[54] ARYLENE SULFIDE POLYMERS

[75] Inventor: Lacey E. Scoggins, Bartlesville, Okla.

[73] Assignee: Phillips Petroleum Company, Bartlesville, Okla.

[22] Filed: Nov. 19, 1973

[21] Appl. No.: 416,778

[52] U.S. Cl........ 260/79.1, 117/132 R, 260/33.4 R, 260/37 R, 260/79
[51] Int. Cl............................................ C08g 23/00
[58] Field of Search............................ 260/79.1, 79

[56] References Cited
UNITED STATES PATENTS

| | | | |
|---|---|---|---|
| 3,306,910 | 2/1967 | Louthan.......................... | 260/293.65 |
| 3,538,166 | 11/1970 | Campbell et al................ | 260/609 E |

*Primary Examiner*—Melvyn I. Marquis

[57] ABSTRACT

A method of producing arylene sulfide polymers employing (1) polyhalosubstituted aromatic compounds; (2) thioamides; (3) bases selected from the hydroxides of lithium, sodium, potassium, rubidium, cesium, magnesium, calcium, strontium and barium and the carbonates of sodium, potassium, rubidium and cesium; and, (4) organic amides.

21 Claims, No Drawings

ARYLENE SULFIDE POLYMERS

This invention pertains to the production of arylene sulfide polymers.

In one of its more specific aspects, this invention pertains to a novel method of producing polymers such as those produced by the method of U.S. Pat. No. 3,354,129.

In U.S. Pat. No. 3,354,129, the disclosure of which is incorporated herein by reference, there is disclosed a method of producing polymers from polyhalo-substituted aromatics, alkali metal sulfides and polar organic compounds. There has now been discovered another method of preparing arylene sulfide polymers.

In accordance with one embodiment of the present invention, arylene sulfide polymers are produced by reacting at least one polyhalo-substituted aromatic compound with a mixture in which at least one thioamide, at least one base selected from the hydroxides of lithium, sodium, potassium, rubidium, cesium, magnesium, calcium, strontium and barium, and the carbonates of sodium, potassium, rubidium and cesium and at least one organic amide are contacted.

The polyhalo-substituted aromatic compounds which can be employed in the method of this invention are compounds in which the halogen atoms are attached to aromatic ring carbon atoms. Suitable compounds include 1,2-dichlorobenzene, 1,3-dichlorobenzene, 1,4-dichlorobenzene and the other polyhalo-substituted aromatic compounds described and exemplified in the aforementioned U.S. Pat. No. 3,354,129. If desired, mixtures of polyhalo-substituted aromatic compounds can be used.

The thioamides which can be used in the process of this invention include acyclic and cyclic thioamides. Thus, thiolactams are included within the scope of operable thioamides. The preferred thioamides for use in this invention can be represented by the formula

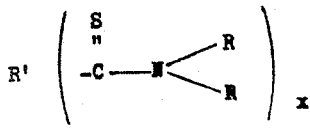

wherein each R is selected from the group consisting of hydrogen and alkyl, cycloalkyl, and aryl radicals, and combinations thereof such as alkaryl, aralkyl and the like; R' is selected from the group consisting of hydrogen and hydrocarbon radicals of valence $x$ selected from saturated hydrocarbon radicals, aromatic hydrocarbon radicals, and combinations thereof such as alkaryl, aralkyl, arylenedialkyl, and the like; and, $x$ is an integer having a value of 1 to 4, with the proviso that when $x = 1$, R' and one R, together, can represent a divalent hydrocarbon radical selected from the group consisting of unsubstituted and alkyl-, cycloalkyl-, and aryl-substituted alkylene, cycloalkylene, and arylene radicals, the total number of carbon atoms in said thioamide being within the range of 1 to about 20. The term "thioamide" as employed herein shall serve to designate such materials as distinguished from "organic amides" as discussed hereinafter.

Examples of some thioamides which can be employed in the process of this invention include thioformamide, N,N-dimethylthioformamide, thioacetamide, N,N-diethylthioacetamide, N-ethylthiopropionamide, N-cyclohexylthiobutyramide, N-isopropyl-N-phenyl-thiohexanamide, N-p-tolylthiooctanamide, N-benzyl-thiododecanamide, N-cyclopentylmethyl-N-3-methylcyclopentylthioacetamide, N,N-dibutylthiobenzamide, N-octyl-2-phenylthioacetamide, thio-p-toluamide, N-dodecyl-3-methylthiohexanamide, thio-eicosanamide, N-nonadecylthioformamide, thiocyclohexanecarboxamide, 3-cyclopentylthiopropionamide, dithiohexanediamide, N,N'-dimethyldithi-oterephthalamide, 1,2-bis(thiocarbamoylmethyl)benzene, 1,2,4-tris(thiocarbamoyl)cyclohexane, 1,2,3,4-tetrakis(thiocarbamoyl)butane, 2-azetidinethione, 2-pyrrolidinethione, 2-piperidinethione, 2-thioxohex-amethylenimine, N-methyl-2-pyrrolidinethione, N-isopropyl-3-ethyl-2-piperidinethione, 4-cyclopentyl-2-pyrrolidinethione, 3-phenyl-2-azetidinethione, thiolactam of 2-aminocyclopentanecarbodithioic acid, thiolactam of 2-amino-4-methylcyclooctanecarbodithioic acid, thiolactam of 2-(methylamino)-3-cyclopentylcyclohexanecarbodithioic acid, thiolactam of 2-amino-4-phenylcyclopentanecarbodithioic acid, thiolactam of 2-aminobenzenecarbodithioic acid, thiolactam of 2-(ethylamino)-3-isopropylbenzenecarbodithioic acid, thiolactam of 2-amino-4-cyclohexylbenzenecarbodithioic acid, thiolactam of 2-amino-5-phenylbenzenecarbodithioic acid and the like and mixtures thereof.

Bases which can be employed in the method of this invention include lithium hydroxide, sodium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate, cesium carbonate, and mixtures thereof. If desired, the hydroxide can be produced in situ by the reaction of the corresponding oxide with water.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like and mixtures thereof.

The components used in the preparation of the arylene sulfide polymer can be introduced into contact in any order. Water which can be present in any composite formed from any of the preceding compounds, for example, the composite formed from the polyhalo-substituted aromatic compound, the thioamide, the base and the organic amide or which can be present in a composite formed from the thioamide, the base and the organic amide can be removed, for example, by distillation, prior to conducting the polymerization reaction. Such water can be present as an impurity, as a solvent or diluent or as water of hydration. Regardless of whether a water removal step is employed, at least a portion of the composition formed from the polyhalo-substituted aromatic compound, the thioamide, the base and the organic amide is maintained at polymerization conditions to produce the arylene sulfide polymer.

The ratio of reactants can vary considerably but about 0.9 to about 2, and preferably about 0.95 to about 1.2, gram-moles of the polyhalo-substituted aromatic compound will generally be employed per gram-atom of sulfur in the thioamide. The base generally will be employed in an amount within the range of from about 1 to about 5, and preferably from about 1.8 to about 4 gram-equivalents per gram-atom of sulfur in the thioamide. As used herein, one gram-equivalent of the hydroxides of magnesium, calcium, strontium, and barium represents the same amount as one-half gram-mole of these substances, whereas for the hydroxides of lithium, sodium, potassium, rubidium, and cesium, or for the carbonates of sodium, potassium, rubidium, and cesium, the amount represented by one gram-equivalent is considered to be the same as that represented by one gram-mole.

The amount of organic amide employed can also vary over a wide range but will generally be within the range of from about 100 grams to about 2,500 grams per gram-mole of polyhalo-substituted aromatic compound employed.

The temperature at which the polymerization can be conducted can vary over a wide range and will generally be within the range of from about 125° C. to about 450° C. and preferably within the range of from about 175° C. to about 350° C. The reaction time will be within the range of from about 10 minutes to about 3 days and preferably from about 1 hour to about 8 hours. The pressure need be only sufficient to maintain the polyhalo-substituted aromatic compound, the thioamide and the organic amide substantially in the liquid phase and to retain the sulfur source therein.

The arylene sulfide polymers produced by the method of this invention can be separated from the reaction mixture by conventional procedures, for example, by filtration of the polymer followed by washing with water, or by dilution of the reaction mixture with water, followed by filtration and water washing of the polymer.

The arylene sulfide polymers prepared by the process of this invention can be blended with fillers, pigments, extenders, other polymers and the like. They can be cured through crosslinking and/or chain extension, for example, by heating at temperatures up to about 480° C. in the presence of a free oxygen-containing gas, to provide cured products having high thermal stability and good chemical resistance. They are useful in the production of coatings, films, molded objects and fibers.

The previous statements are based upon the following examples.

EXAMPLES

In the following examples, values for inherent viscosity were determined at 206° C. in 1-chloronaphthalene at a polymer concentration of 0.4 g/100 ml solution.

EXAMPLE I

To a stirred reactor were charged 75 g (1.87 moles) sodium hydroxide, 10 g water, 104 g (0.905 mole) N-methyl-2-pyrrolidinethione (the thioamide), and 500 ml (513 g) N-methyl-2-pyrrolidone (the organic amide). The reactor was sealed under a nitrogen pressure of 60 psig and then heated to about 204° C. with rapid stirring. Into the reactor at 204° C. were pressured with nitrogen 135 g (0.92 mole) p-dichlorobenzene and 150 ml (154 g) N-methyl-2-pyrrolidone (the organic amide) bringing the reactor pressure to 185 psig. The reactor was heated to 246° C. and maintained at this temperature for 4 hours. The pressure rose from 220 psig at the beginning to 250 psig at the end of the 4 hour heating period. After the reactor had cooled, the contents were mixed with water, and the polymer was separated by filtration. The polymer was washed four times with deionized water and vacuum dried at 82° C. to obtain 76.4 g (78 percent yield) of poly(p-phenylene sulfide) having an inherent viscosity of 0.07.

A mixture consisting of 60 parts by weight of the polymer, 20 parts by weight titanium dioxide, and 150 parts by weight propylene glycol was applied as three coats to a carbon steel substrate, the polymer being cured by heating at 371° C. for 30 minutes after the application of each coating, to produce a final coating which was insoluble in common solvents.

EXAMPLE II

To a stirred reactor equipped for distillation were charged 168 g (4.2 moles) sodium hydroxide, 202 g deionized water, and 400 ml (410 g) N-methyl-2-pyrrolidone (the organic amide). Approximately 180 ml water was distilled from the reactor upon heating to a temperature of 180° C. To the reactor was then added 230 g (2.0 moles) N-methyl-2-pyrrolidinethione (the thioamide), followed with 50 ml (51 g) N-methyl-2-pyrrolidone (the organic amide). After 5 minutes 298 g (2.03 moles) p-dichlorobenzene in 160 ml (164 g) N-methyl-2-pyrrolidone (the organic amide) was pressured with nitrogen into the reactor. The resulting mixture was then heated at 246° C. for 4½ hours, during which time the pressure increased from 95 psig to 170 psig. After the reactor had cooled, the polymer was separated, washed, and dried as in Example I to obtain 207 g (96 percent yield) of poly(p-phenylene sulfide) having an inherent viscosity of 0.17. This polymer had a glass transition temperature of 82° C. and a crystalline melting point of 283° C., each as determined by differential thermal analysis. The infrared spectrum of the poly(p-phenylene sulfide) was essentially the same as that produced through use of p-dichlorobenzene, sodium sulfide, and N-methyl-2-pyrrolidone in accordance with the method of U.S. Pat. No. 3,354,129.

A mixture consisting of 60 parts by weight of the polymer, 20 parts by weight titanium dioxide, and 150 parts by weight propylene glycol was applied as three coats to a carbon steel substrate, the polymer being cured by heating at 371° C. for 30 minutes after the application of each coat, to produce a final coating which was tough, flexible, and insoluble in common solvents.

EXAMPLE III

To a stirred reactor were charged 163 g (4.07 moles) sodium hydroxide, 360 g N-methyl-2-pyrrolidone (the organic amide), 230 g (2.0 moles) N-methyl-2-pyrrolidinethione (the thioamide), and 200 ml deaerated deionized water. The resulting mixture was heated to 140° C. with stirring, before distillation of water from the mixture. The mixture was then heated to 200° C. during which time approximately 205 ml distillate, chiefly water, distilled from the reactor. A hot solution of 298 g (2.03 moles) p-dichlorobenzene and 200 g N-methyl-2-pyrrolidone (the organic amide) was pressured with nitrogen into the reactor. A nitrogen cap of 130 psig was placed on the reactor, after which the reaction temperature was maintained at 249° C. for 3 hours, the final pressure being 170 psig. After the reactor had cooled, the polymer was isolated, washed, and dried as described in Example I to obtain 172 g (80 percent yield) of poly(p-phenylene sulfide) having an inherent viscosity of 0.15.

A mixture consisting of 60 parts by weight of the polymer, 20 parts by weight titanium dioxide, and 150 parts by weight propylene glycol was applied as three coats to a carbon steel substrate, the polymer being cured by heating at 371°C. for 30 minutes after the application of each coating, to produce a final coating which was tough, flexible, and insoluble in common solvents.

EXAMPLE IV

To a stirred reactor equipped for distillation were charged 81 g (2.02 moles) sodium hydroxide, 500 ml (560 g) 2-pyrrolidone (the organic amide), 100 ml deaerated water, and 101.1 g (1.0 mole) 2-pyrrolidinethione (the thioamide). Approximately 70 ml water was distilled from the reactor upon heating to a temperature of 200° C. To the reactor was then charged, with the aid of nitrogen pressure, 150 g (1.02 moles) molten p-dichlorobenzene, and the reactor was pressured with nitrogen to 80 psig. The resulting mixture was heated to 248° C., at which temperature the pressure was 100 psig. The mixture was then maintained at 248° C. for 3 hours, at the end of which time the pressure was 150 psig. After the reactor had cooled, the polymer was separated, washed, and dried as in Example I to obtain 55 g (51 percent yield) of poly(p-phenylene sulfide) having an inherent viscosity of 0.04. The infrared spectrum of this polymer was essentially the same as that produced through use of p-dichlorobenzene, sodium sulfide, and N-methyl-2-pyrrolidone in accordance with the method of U.S. Pat. No. 3,354,129.

It will be evident from the foregoing that various modifications can be made to the method of this invention. Such are considered, however, to be within the scope thereof.

What is claimed is:

1. A method of producing a polymer which comprises:

a. forming a composition by contacting a polyhalo-substituted aromatic compound in which the halogen atoms are attached to aromatic ring carbon atoms, a thioamide, a base and an organic amide, said base being selected from hydroxides of lithium, sodium, potassium, rubidium, cesium, magnesium, calcium, strontium and barium and the carbonates of sodium, potassium, rubidium and cesium, said thioamide having the formula

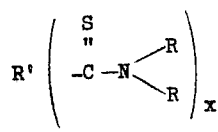

wherein each R is selected from the group consisting of hydrogen and alkyl, cycloalkyl and aryl radicals and combinations of said radicals; R' is selected from the group consisting of hydrogen and hydrocarbon radicals of valence x selected from saturated hydrocarbon radicals, aromatic hydrocarbon radicals and combinations of said radicals, and x is an integer of 1 to 4, with the proviso that when $x = 1$, R' and one R together can represent a divalent hydrocarbon radical selected from the group consisting of unsubstituted and alkyl-, cycloalkyl- and aryl-substituted alkylene, cycloalkylene and arylene radicals, the total number of carbon atoms in said thioamide being within the range of 1 to about 20; and, b. maintaining at least a portion of said composition at polymerization conditions to produce said polymer.

2. The method of claim 1 in which said thioamide is selected from the group consisting of thioformamide, N,N-dimethylthioformamide, thioacetamide, N,N-diethylthioacetamide, N-ethylthiopropionamide, N-cyclohexylthiobutyramide, N-isopropyl-N-phenylthiohexanamide, N-p-tolylthiooctanamide, N-benzylthiododecanamide, N-cyclopentylmethyl-N-3-methylcyclopentylthioacetamide, N,N-dibutylthiobenzamide, N-octyl-2-phenylthioacetamide, thio-p-toluamide, N-dodecyl-3-methylthiohexanamide, thioeicosanamide, N-nonadecylthioformamide, thiocyclohexanecarboxamide, 3-cyclopentylthiopropionamide, dithiohexanediamide, N,N'-dimethyldithioterephthalamide, 1,2-bis(thiocarbamoylmethyl)-benzene, 1,2,4-tris(thiocarbamoyl)cyclohexane, 1,2,3,4-tetrakis(thiocarbamoyl)-butane, 2-azetidinethione, 2-pyrrolidinethione, 2-piperidinethione, 2-thioxohexamethylenimine, N-methyl-2-pyrrolidinethione, N-isopropyl-3-ethyl-2-piperidinethione, 4-cyclopentyl-2-pyrrolidinethione, 3-phenyl-2-azetidinethione, thiolactam of 2-aminocyclopentanecarbodithioic acid, thiolactam of 2-amino-4-methylcyclooctanecarbodithioic acid, thiolactam of 2-(methylamino)-3-cyclopentylcyclohexanecarbodithioic acid, thiolactam of 2-amino-4-phenylcyclopentanecarbodithioic acid, thiolactam of 2-aminobenzenecarbodithioic acid, thiolactam of 2-(ethylamino)-3-isopropylbenzenecarbodithioic acid, thiolactam of 2-amino-4-cyclohexylbenzenecarbodithioic acid, thiolactam of 2-amino-5-phenylbenzenecarbodithioic acid, and the like, and mixtures thereof.

3. The method of claim 1 in which said polyhalo-substituted aromatic compound is employed in an amount within the range of from about 0.9 to about 2 gram-moles per gram-atom of sulfur in said thioamide.

4. The method of claim 1 in which said base is employed in an amount within the range of from about 1 to about 5 gram-equivalents per gram-atom of sulfur in said thioamide.

5. The method of claim 1 in which said polyhalo-substituted aromatic compound is p-dichlorobenzene, said base is sodium hydroxide, said organic amide is N-methyl-2-pyrrolidone and said thioamide is N-methyl-2-pyrrolidinethione.

6. The method of claim 1 in which water is present at said contacting of said polyhalo-substituted aromatic compound, said thioamide, said base and said organic amide.

7. The method of claim 1 in which an organic amide, water and an alkali metal hydroxide are contacted to form a first composite, water is removed from said first composite to form a second composite and said polyhalo-substituted aromatic compound and said thioamide are introduced into said second composite.

8. The method of claim 7 in which said thioamide is N-methyl-2-pyrrolidinethione.

9. The method of claim 1 in which an organic amide, an alkali metal hydroxide, water and a thioamide are contacted to form a first composite, water is removed from said first composite to form a second composite and a polyhalo-substituted aromatic compound and an organic amide are introduced into said second composite.

10. The method of claim 1 in which an organic amide, an alkali metal hydroxide, water and a thioamide are contacted to form a first composite, water is removed from said first composite to form a second composite and a polyhalo-substituted aromatic compound is introduced into said second composite.

11. The method of producing a polymer which comprises:
  a. contacting at least one base, at least one organic amide and at least one thioamide to form a first composition;
  b. contacting at least a portion of said first composition with at least one polyhalo-substituted aromatic compound wherein the halogen atoms are attached to aromatic ring carbon atoms to form a second composition; and,
  c. maintaining said second composition at polymerization conditions to form said polymer, said base being selected from hydroxides of lithium, sodium, potassium, rubidium, cesium, magnesium, calcium, strontium and barium and the carbonates of sodium, potassium, rubidium and cesium, said thioamide having the formula

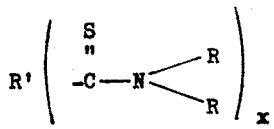

wherein each R is selected from the group consisting of hydrogen and alkyl, cycloalkyl and aryl radicals and combinations of said radicals; R' is selected from the group consisting of hydrogen and hydrocarbon radicals of valence $x$ selected from saturated hydrocarbon radicals, aromatic hydrocarbon radicals and combinations of said radicals, and $x$ is an integer of 1 to 4, with the proviso that when $x = 1$, R' and one R together can represent a divalent hydrocarbon radical selected from the group consisting of unsubstituted and alkyl-, cycloalkyl- and aryl-substituted alkylene, cycloalkylene and arylene radicals, the total number of carbon atoms in said thioamide being within the range of 1 to about 20.

12. The method of claim 11 in which said thioamide is selected from the group consisting of thioformamide, N,N-dimethylthioformamide, thioacetamide, N,N-diethylthioacetamide, N-ethylthiopropionamide, N-cyclohexylthiobutyramide, N-isopropyl-N-phenylthiohexanamide, N-p-tolylthiooctanamide, N-benzylthiododecanamide, N-cyclopentylmethyl-N-3-methylcyclopentylthioacetamide, N,N-dibutylthiobenzamide, N-octyl-2-phenylthioacetamide, thio-p-toluamide, N-dodecyl-3-methylthiohexanamide, thioeicosanamide, N-nonadecylthioformamide, thiocyclohexanecarboxamide, 3-cyclopentylthiopropionamide, dithiohexanediamide, N,N'-dimethyldithioterephthalamide, 1,2-bis(thiocarbamoylmethyl)-benzene, 1,2,4-tris(thiocarbamoyl)cyclohexane, 1,2,3,4-tetrakis(thiocarbamoyl)-butane, 2-azetidinethione, 2-pyrrolidinethione, 2-piperidinethione, 2-thioxohexamethylenimine, N-methyl-2-pyrrolidinethione, N-isopropyl-3-ethyl-2-piperidinethione, 4-cyclopentyl-2-pyrrolidinethione, 3-phenyl-2-azetidinethione, thiolactam of 2-aminocyclopentanecarbodithioic acid, thiolactam of 2-amino-4-methylcyclooctanecarbodithioic acid, thiolactam of 2-(methylamino)-3-cyclopentylcyclohexanecarbodithioic acid, thiolactam of 2-amino-4-phenylcyclopentanecarbodithioic acid, thiolactam of 2-aminobenzenecarbodithioic acid, thiolactam of 2-(ethylamino)-3-isopropylbenzenecarbodithioic acid, thiolactam of 2-amino-4-cyclohexylbenzenecarbodithioic acid, thiolactam of 2-amino-5-phenylbenzenecarbodithioic acid, and the like, and mixtures thereof.

13. The method of claim 11 in which said polyhalo-substituted aromatic compound is employed in an amount within the range of from about 0.9 to about 2 gram-moles per gram-atom of sulfur in said thioamide.

14. The method of claim 11 in which said base is employed in an amount within the range of from about 1 to about 5 gram-equivalents per gram-atom of sulfur in said thioamide.

15. The method of claim 11 in which said polyhalo-substituted aromatic compound is p-dichlorobenzene, said base is sodium hydroxide, said organic amide is N-methyl-2-pyrrolidone and said thioamide is N-methyl-2-pyrrolidinethione.

16. The method of claim 11 in which water is present at the contacting of said polyhalo-substituted aromatic compound, said thioamide, said base and said organic amide.

17. The method of claim 11 in which said polyhalo-substituted aromatic compound is p-dichlorobenzene, said base is sodium hydroxide, said organic amide is 2-pyrrolidone and said thioamide is 2-pyrrolidinethione.

18. The method of claim 1 in which water is removed from the composition formed in step (a) prior to step (b).

19. The method of claim 6 in which water is removed from the composition formed in step (a) subsequent to the introduction of said water into said contacting.

20. The method of claim 11 in which water is removed from the composition formed in step (a) prior to step (b).

21. The method of claim 16 in which water is removed from the composition formed in step (a) subsequent to the introduction of said water into said contacting.

* * * * *